United States Patent Office 3,595,640
Patented July 27, 1971

3,595,640
PROCESS FOR PRODUCING DISPERSION
STRENGTHENED IRON POWDER
W. J. Dennis Stone, 253 Westcroft Ave., and David
Stewart Hay, 355 Penn St., both of Beaconsfield, Quebec, Canada
No Drawing. Filed Oct. 17, 1968, Ser. No. 768,541
Claims priority, application Great Britain, Oct. 19, 1967,
47,742/67
Int. Cl. B22f 9/00, 3/12
U.S. Cl. 75—.5AA 4 Claims

ABSTRACT OF THE DISCLOSURE

A finely divided natural hematite ore concentrate containing silica, alumina and other acid insoluble impurities is passed through a high intensity wet magnetic separator to remove impurities other than alumina, after which the purified, finely divided hematite is reduced in the presence of hydrogen at a temperature below the melting point of iron and the iron powder obtained with alumina uniformly dispersed therein is collected.

BACKGROUND OF THE INVENTION (1) Field of the invention

The invention relates to a process for producing dispersion strengthened iron powder.

(2) Description of prior art

This is normally done in iron powder metallurgy by the addition of small amounts of alumina. Great difficulties are encountered in adding the alumina in the small quantities required, while obtaining correct dispersion of the alumina throughout the resulting sintered metal.

The principal impurity normally found in iron ores is silica, which is usually present with smaller amounts of other impurities. Among these other impurities in many iron ores there is present small amounts of alumina. In the techniques used in the past for purifying iron ore concentrates the alumina was removed with the other impurities. For example, Canadian Patent No. 519,725, issued Dec. 20, 1955 describes a process for producing iron powder from magnetite ore in which the silica (and also alumina) are removed by chemical treatment with hydrofluoric acid.

SUMMARY OF THE INVENTION

According to this invention it has been found that if a finely divided hematite ore concentrate containing small amounts of silica, alumina and other acid insoluble impurities is passed through a high intensity wet magnetic separator, practically all of the impurities other than alumina can be selectively removed. This hematite containing a small amount of alumina is then treated with a reducing agent at reducing temperatures below the melting point of iron to produce an iron powder containing a small amount of uniformly dispersed alumina, which is then available for dispersion strengthening of sintered metal made from iron powder.

This has the very great advantage that the alumina present in the iron powder is in a very finely dispersed state. Moreover, it overcomes the very difficult problem of trying to disperse a small amount of alumina in iron powder as well as avoiding the additional cost of making such an addition as a separate processing step.

DESCRIPTION OF THE PREFERRED EMBODIMENTS

The reduction can be carried out by any of the usual reducing agents, such as solid carbon, gaseous reducing agents such as hydrogen or a mixture of both the solid and gaseous reducing agents. A wide range of temperatures are possible during reduction with higher temperatures favouring faster reaction rate. The temperature is below the melting point of iron and is preferably above 1600° F.

The iron product from the reduction stage is in the form of an agglomerate of lightly adhering particles which easily breaks down into its component particles. This can be conveniently done by means of impact densification.

The invention is illustrated by the following non-limitative example:

Example 1.—As starting material a commercial specular hematite ore concentrate was used containing 66.2% iron, 5.1% silica and 0.61% alumina. A screen analysis of this ore concentrate is given below in Table I.

TABLE I

| Mesh: | Percent by weight |
|---|---|
| +6 | |
| −6+10 | 3.7 |
| −10+20 | 23.2 |
| −20+35 | 38.1 |
| −35+65 | 22.8 |
| −65+100 | 5.6 |
| −100+150 | 4.2 |
| −150+200 | 1.3 |
| −200+325 | 0.6 |
| −325 | 0.1 |

The ore concentrate was passed through a Jones high-intensity wet magnetic separator to obtain an iron oxide powder containing less than 0.2% by weight of acid insolubles (impurities).

The purified iron oxide was subjected to hydrogen reduction in a two stage operation. The reduction was carried out in a belt furnace with indirect gas heating. For the reduction approximately two times the theoretically required amount of hydrogen is used i.e. about 25,000 cubic feet per ton of ore.

The purified iron oxide was contacted with the hydrogen at a furnace temperature of 2200° F. and remained in contact with the hydrogen for approximately four hours. The partly reduced powder emerging from the furnace was then subjected to impact densification in a hammer mill.

The partly reduced product contained 0.4% by weight of acid insolubles. The hydrogen loss on the product was 4% (which indicated that 4% of oxygen yet remained). The flow rating of the product was 41 seconds and its apparent density was 2.1 gram per cc.

This partially reduced product was then passed through the furnace a second time in contact with hydrogen at a furnace temperature of 2100° F. for a period of four hours.

A screen analysis of the final product emerging from the furnace is given in Table II below.

TABLE II

| Mesh: | Percent by weight |
|---|---|
| +65 | |
| −65+80 | |
| −80+100 | 0.6 |
| −100+150 | 22.9 |
| −150+200 | 26.6 |
| −200+270 | 25.1 |
| −270+325 | 8.6 |
| −325 | 16.2 |

The final product contained approximately 0.62% by weight of acid insolubles and showed a hydrogen loss of 0.15%. Its flow rating was 35 seconds and its apparent density 2.2 grams per cc.

A chemical analysis of a sample of the insoluble content recovered from this iron powder was analysed and the following quantitative analysis was obtained:

TABLE III

| | |
|---|---|
| Al | 36.61 |
| Ti | 5.78 |
| Mg | 1.05 |
| Si | 3.88 |
| U | 1.35 |

The iron powder produced in accordance with this invention was subjected to a series of tests by an independent testing organization. In these the standard used for comparison was iron powder available from Hoeganaes Sponge Iron Corporation under the trademark Hoeganaes Ancor MH100, which is generally accepted in the industry as the standard.

Compaction tests were conducted on the two samples with each being compacted at 30 and 50 tons per square inch with .75% zinc stearate lubricant. The samples were sintered in dissociated ammonia at 2050° F. for 45 minutes.

The results of physical tests on these samples were as follows:

TABLE IV

| | Production of invention | | Hoeganaes | |
|---|---|---|---|---|
| Compacting pressure, t.s.i. | 30 | 50 | 30 | 50 |
| Green density, grams/cc | 6.43 | 6.86 | 6.46 | 6.95 |
| Green strength, p.s.i. | 900 | 2,200 | 1,820 | 3,800 |
| Sintered density, grams/cc | 6.40 | 6.82 | 6.43 | 6.93 |
| Change in length on sintering percent | −0.33 | −0.23 | −0.13 | −0.15 |
| Tensile strength, p.s.i. | 24,500 | 30,300 | 19,500 | 25,500 |
| Elongation, percent in 1″ | 9.7 | 14.1 | 7.1 | 9.8 |
| Rockwell Hardness, $R_H$ | 74 | 85 | 76 | 88 |

It will be seen from the above data that the product of this invention is considerably superior to the industrial standard in two of the most important strength characteristics, i.e. tensile strength and elongation.

What we claim as our invention is:

1. A process for producing iron powder having a small amount of alumina uniformly dispersed therein, characterized in that a finely divided natural hematite ore containing silica, alumina and other acid insoluble impurities is passed through a high intenity wet magnetic separator to remove a substantial portion of impurities other than alumina, treating the purified, finely divided hematite with a reducing agent at reducing temperatures below the melting point of iron and collecting the iron product obtained with alumina uniformly dispersed therein.

2. A process according to claim 1 characterized in that the purified hematite contains less than 0.2% by weight of acid insoluble impurities.

3. A process according to claim 2, characterized in that the reduction is conducted at a temperature between 1600° F. and the melting point of iron.

4. A process according to claim 2, characterized in that the iron powder obtained is sintered to form a dispersion strengthened molded product.

References Cited
UNITED STATES PATENTS

| | | | |
|---|---|---|---|
| 3,148,972 | 9/1964 | Peras | 75—1 |
| 3,414,402 | 12/1968 | Volk et al. | 75—1 |
| 3,441,401 | 4/1969 | Stone et al. | 75—1 |

L. DEWAYNE RUTLEDGE, Primary Examiner

W. W. STALLARD, Assistant Examiner

U.S. Cl. X.R.

75—206, 211